No. 613,894. Patented Nov. 8, 1898.
J. VAUGHAN-SHERRIN.
DYNAMO AND ELECTRIC MOTOR FOR DRIVING VEHICLES.
(Application filed Aug. 17, 1896.)
(No Model.) 2 Sheets—Sheet 1.
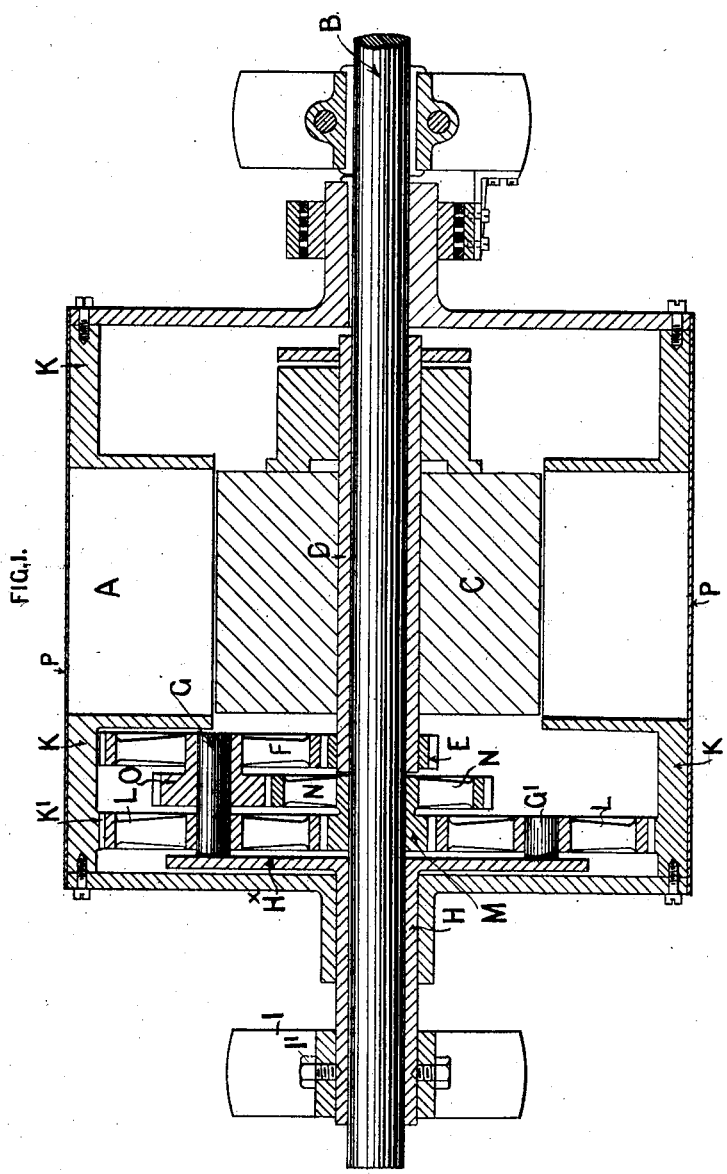
Witnesses
Inventor
John Vaughan-Sherrin
By Henry Orth
Attorney No. 613,894. Patented Nov. 8, 1898.
J. VAUGHAN-SHERRIN.
DYNAMO AND ELECTRIC MOTOR FOR DRIVING VEHICLES.
(Application filed Aug. 17, 1896.)
(No Model.) 2 Sheets—Sheet 2.
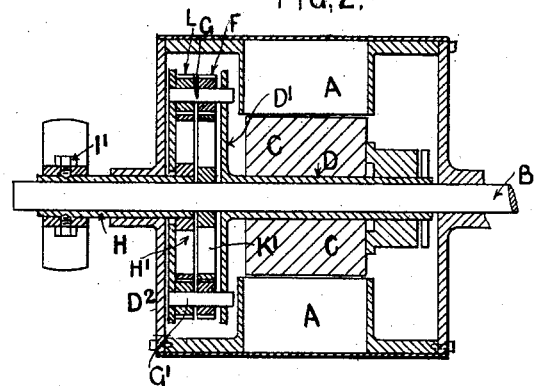
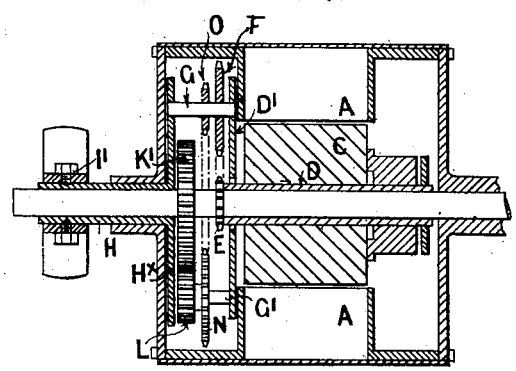
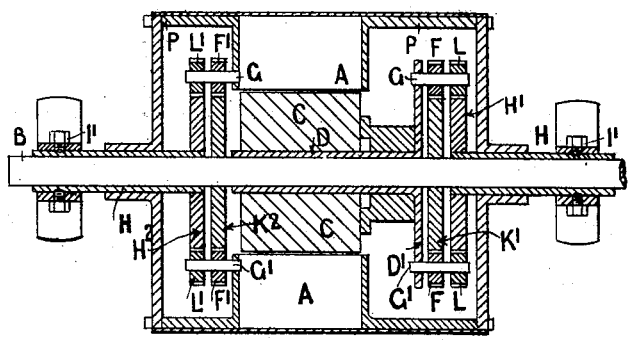

UNITED STATES PATENT OFFICE.

JOHN VAUGHAN SHERRIN, OF RAMSGATE, ENGLAND, ASSIGNOR TO THE BRITTANNIA MOTOR CARRIAGE COMPANY, LIMITED, OF LONDON, ENGLAND.

DYNAMO AND ELECTRIC MOTOR FOR DRIVING VEHICLES.

SPECIFICATION forming part of Letters Patent No. 613,894, dated November 8, 1898.

Application filed August 17, 1896. Serial No. 603,015. (No model.)

*To all whom it may concern:*

Be it known that I, JOHN VAUGHAN SHERRIN, a subject of the Queen of Great Britain, residing at Ramsgate, in the county of Kent, England, have invented new and useful improvements in and connected with dynamos and the driving of same and electric motors for the driving of vehicles and machinery, of which the following is a specification.

According to this invention the armature and the field-magnets rotate in opposite directions at the same or at different speeds, while both hang on and actuate the dynamo-driving shaft or the motor-shaft, and by means of suitable gearing the speed of rotation of the said shaft is suited to the requirements of the dynamo or the machine to be driven, whether, for instance, such machine be a road-carriage, a tricycle, or a lathe, sewing-machine, crane, or any other machine.

Figure 1 is a longitudinal axial sectional view of an electric motor embodying my invention, and Figs. 2, 3, and 4 are like views illustrating certain modifications in the relative arrangement of the elements and speed-controlling gearing.

For what may be called a "slow-driving" electric motor (shown in the sectional view, Fig. 1, and applicable, for instance, to a road or other carriage) the field-magnets A are fixed on the wheel-axle B, which in this case forms the motor-shaft, and the armature C is fixed on a sleeve D or bosses free to rotate on the motor-axle. Between the two is arranged wheel-gearing to differentiate the speed of the two and to allow the motor-shaft or vehicle-axle to run sensibly slower than the armature. The drum K, which is keyed to the shaft B and carries the field-magnets, has an internal tooth-wheel rim K', which gears with the two tooth-wheels L, that work loose on gudgeons G G', fixed to arms H$^\times$, extending from a frame H, which latter is fixed to one of the bearings I, for instance, by set-screws I', as shown. The wheels L gear with a pinion M, mounted on the shaft B and carrying a tooth-wheel N, which gears with a pinion O, mounted on the gudgeon G and carrying a tooth-wheel F, which gears with a pinion E, that is fixed on the sleeve D, which carries the armature C and runs loose on the shaft B. The current is supplied from primary or secondary batteries on the vehicle, the motor-axle being provided with a disk of insulating material with two or more metal bands, and the brushes are attached to an outer case or support of insulating material. The motor is inclosed in a casing P, which in some cases forms the boss or nave of the wheel.

In Fig. 2 is shown a simpler arrangement of gearing. The tooth-wheel K' is keyed to the axle B, and the tooth-wheel H' is fixed on or in one with the sleeve H, which is kept from rotating by a set-screw I', as in Fig. 1, or by any other suitable means. Into the wheels H' and K' gear the pinions L and F, which run free on the spindle G, that is mounted at one end in one of the arms D', extending from the sleeve D, and at the other end mounted in one of the arms D$^2$, the boss of which runs clear of the sleeve H. The pinions L F thus roll upon the wheels H' K'. If, as an example, the wheel K' has thirty teeth and the wheel H' has thirty-two teeth, then the shaft B will run sixteen times slower than the armature C. Similar pinions are by preference mounted in opposite arms D' D$^2$, as shown.

In Fig. 3 is shown an equivalent sprocket wheel and chain arrangement. On the shaft B is fixed a tooth-wheel K', which gears with a pinion L on a spindle G', which latter has its bearings in an arm H$^\times$ on the sleeve H and in one of the arms D'. On the spindle G' is fixed a sprocket-wheel N, which by chain is connected to the sprocket-wheel O. On the spindle of the latter is fixed a sprocket-wheel F, which by chain is connected to the sprocket-wheel E, that is fixed on the sleeve D.

Fig. 4 shows another form in which the gearing is duplicated, the connection from the field-magnet A to the shaft B being made by the gearing on the left-hand side and the connection from the armature C to the shaft B being made by the gearing on the right-hand side, the effect being that both the field-magnet and the armature while rotating in opposite directions drive the shaft B. As an example of proportion of gearing, the wheels H' and K², the latter fast on axle B, may have thirty teeth and the wheels K' and H² thirty-two teeth. This construction is of special advantage for cranes, where a considerable reduction of speed is required. The gearing shown in Figs. 1 and 3 may also in some cases be advantageously applied in this construction.

It will be observed that in the construction of motor shown in the drawings the sleeve H, that carries some of the speed-controlling gearing, is arranged between the shaft B and one or both hubs of the field-magnets, said sleeve being loose on said shaft B and held against rotation, so that the whole motor can be inclosed within the field-magnet casing.

For an electric launch the propeller blades or paddles are attached to the outside of an inclosing casing, so as to form a screw-propeller or a paddle-wheel.

For driving lathes or other stationary machinery the motor-shaft is mounted in bearings on a bed-plate or standard.

For driving a dynamo at a suitably-high speed by means of a steam-engine or other prime mover or driver the armature is fixed on a sleeve or bosses free to rotate on the engine-shaft, and the field-magnets are fixed on the said shaft, and gearing is provided between the two.

The gearing may be toothed gearing, partly or wholly made with teeth of vulcanite, ebonite, or the like. By means of change-gearing two or more speeds may be obtained.

What I claim as my invention, and desire to secure by Letters Patent, is—

1. An electric motor comprising a driving-shaft, field-magnets in a frame revoluble therewith, an armature rotating on said shaft, a stationary sleeve between the hub of the field-magnet casing and the shaft, said hub rotating on the said sleeve and said shaft rotating in the said sleeve, and speed-reducing gearing connecting the armature and the field-magnet casing with the shaft, some of the gearing carried by said sleeve, substantially as set forth.

2. An electric motor comprising a driving-shaft, field-magnets in a casing-shaped framing which incloses the motor and is fixed on the shaft, an armature rotating on said shaft, a stationary sleeve between the hub of the said casing and the shaft, said hub rotating on the said sleeve and said shaft rotating in the said sleeve, and speed-reducing gearing connecting the armature and the field-magnet with the shaft, some of the gearing carried by said sleeve, substantially as and for the purpose set forth.

JOHN VAUGHAN SHERRIN.

Witnesses:
V. JENSEN,
JOSEPH LAKE.